R. A. FESSENDEN.
METHOD AND APPARATUS FOR LOCATING ORE BODIES.
APPLICATION FILED JAN. 15, 1917.
1,240,328.
Patented Sept. 18, 1917.
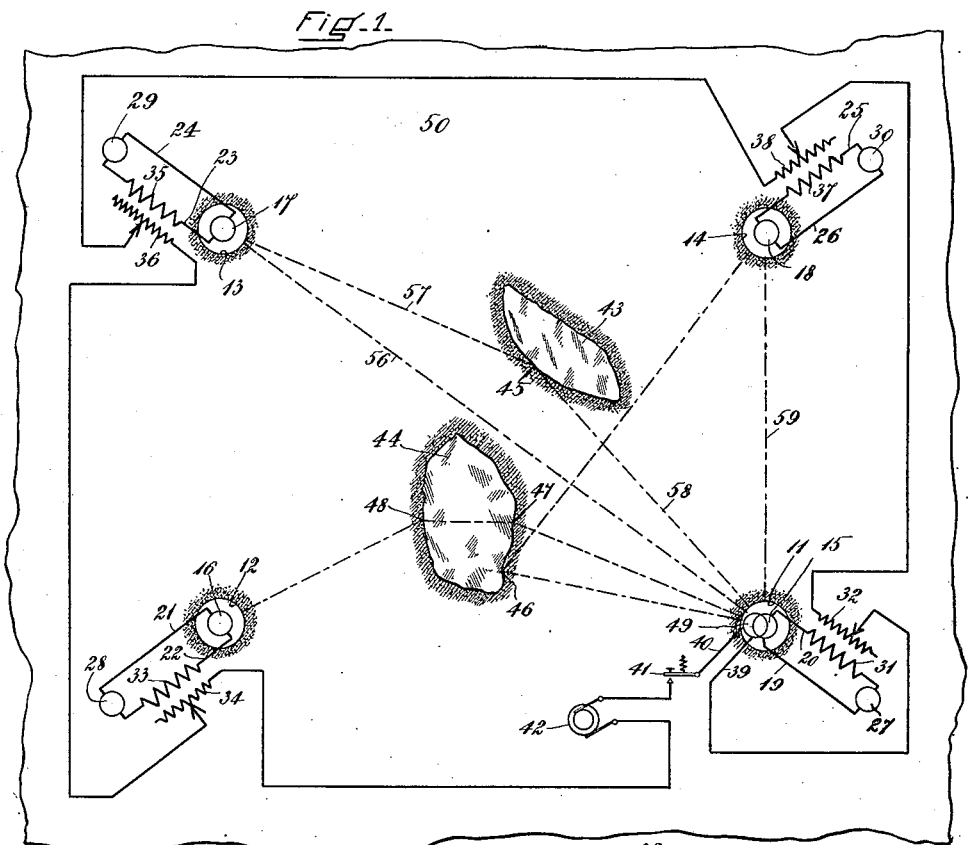
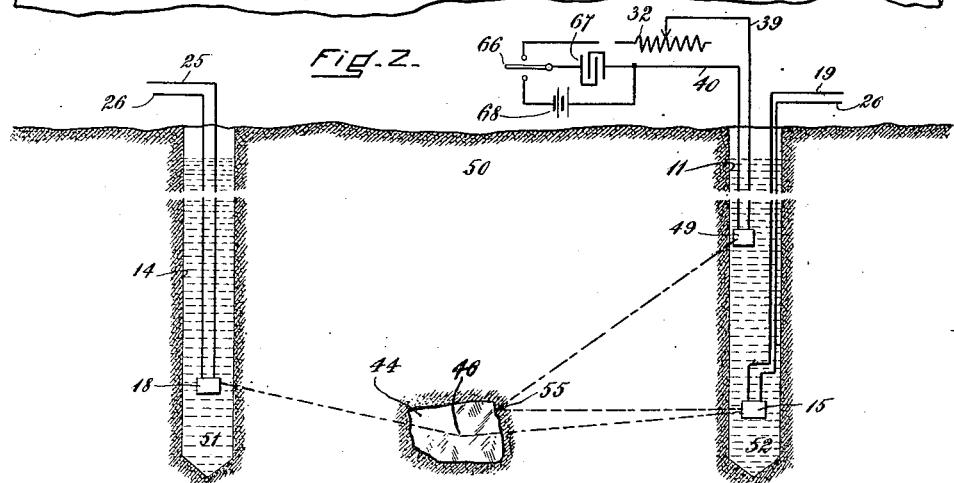

UNITED STATES PATENT OFFICE.

REGINALD A. FESSENDEN, OF BROOKLINE, MASSACHUSETTS, ASSIGNOR TO SUBMARINE SIGNAL COMPANY, OF WATERVILLE, MAINE, A CORPORATION OF MAINE.

METHOD AND APPARATUS FOR LOCATING ORE-BODIES.

1,240,328.  Specification of Letters Patent. Patented Sept. 18, 1917.

Original application filed April 2, 1914, Serial No. 828,972. Divided and this application filed January 15, 1917. Serial No. 142,421.

*To all whom it may concern:*

Be it known that I, REGINALD A. FESSENDEN, of Brookline, in the county of Norfolk and State of Massachusetts, a citizen of the United States, have invented a new and useful Improvement in Methods and Apparatus for Locating Ore-Bodies, of which the following is a specification.

This application is a division of my United States application Serial No. 828,972 filed April 2, 1914.

The invention described herein relates to methods and apparatus whereby, being given or having ascertained, two or more of the following quantities, i. e., time, distance, intensity and medium, one or more of the remaining quantities may be determined.

For example, being given the distance between two points in a mine, and having determined the time taken by a sound wave to travel between the two points, it is possible to draw conclusions in regard to the probable nature of the rock between the two points, or if an echo be observed, or a refraction of the sound, it is possible to estimate the distance of the reflecting or refracting vein.

Heretofore only such ore bodies have been discovered as have had an edge of the mineral vein extending to the surface of the earth and not covered by debris to such an extent as to be hidden, or such as have been reached by drill holes sunk at random in locations where minerals were suspected. The ore bodies so discovered must form an extremely small fraction of the total of such bodies and it is the object of the present invention to disclose methods and apparatus for discovering such hidden ore bodies by means of measurements made on the velocity, direction, reflection, refraction, absorption and other phenomena, of sounds transmitted through the medium containing the ore bodies, i. e., the earth.

By the method herein described I have been able to detect and determine the location of a body of mineral, invisible to the eye, at a distance of two and a half miles, and farther, the test being witnessed and verified by a number of skilled engineers.

In the drawings accompanying and forming a part of this specification,

Figure 1 is a diagrammatic plan, and

Fig. 2 an illustrative section showing also a different source of energy.

Fig. 3 is a modification of the receiver, these views being in part diagrammatical and showing apparatus and methods suitable for carrying out my invention.

In Figs. 1 and 2, 50 represents a territory, which may be assumed to have an area of 25 square miles, within which it is desired to determine the presence or absence of mineral veins.

Four drill holes, 11, 12, 13, 14, shown in plan in Fig. 1 and two of them in section in Fig. 2, are first drilled at the four corners of the territory, approximately five miles apart, and of a depth sufficient to secure the desired results. These holes are filled with water 51, 52, Fig. 2. Sound detective devices, 15, 16, 17, 18, such as microphones or preferably small oscillators, as described in United States Patent No. 1,167,366, January 4, 1916, are suspended in these holes below the water line.

These sound receiving devices are connected by the pairs of leads, 19, 20, 21, 22, 23, 24, 25, 26, to the secondaries 31, 33, 35, 37, of transformers, as shown, and to oscillographs of the usual photographic recording type, but preferably with the galvanometer elements of the quartz fiber, described by applicant at the American Association for the Advancement of Science, 1894, and commonly known as Einthoven galvanometers.

49 is a sound producing apparatus, preferably of the said oscillator type, connected by its leads, 39, 40, to the primaries 32, 34, 36, 38, of the transformers in the oscillograph circuits, and to the alternating current dynamo 42, when the key 41 is depressed. 43, 44 are ore bodies.

The primaries 32, 34, 36 and 38 of the transformers are adjustable with reference to the secondaries, as shown, and are so adjusted that when the key 41 is depressed a moderately strong indication is produced on the photographic records of the oscillographs 27, 28, 29, 30, which fixes on the photographic records the instant at which the key is depressed, and at the same time a sound is sent out from the oscillator 49, which after being reflected as at 45 by the ore body 43, or reflected back as from 55, Fig. 2, by the ore body 44, or reflected as from 46 by the ore body 44, or refracted as at 47, 48 by the ore body 44, or proceeding directly through the earth, as shown by the dotted lines 56, 57, reaches the indicators 17, 18, 16, 15, and is recorded on the oscillographs 29, 30, 28, 27.

Since the oscillograph photographic strip moves with a regular and known velocity, determined in the manner well known in the art, the distance on the strips between the records produced through the transformers when the key 41 was pressed down, and the records made by the sounds received whether direct, or by reflection or refraction or by the echo, will indicate the distance between the drill holes and the ore bodies.

For example, if the distance between the record made on the oscillograph 30 by the transformer 37, 38 on depressing the key 41, and the record made by the arrival of the sound directly along the line 59 (which would be easily identified, being the first sound to record itself after the depression of the key), is five inches, then one inch on the record corresponds to one mile in distance, since 11 is five miles from 14. This establishes the standard of measurement on the oscillograph.

If, then, the length between the key depression record and the record made at 30 by the sound reflected at 46 is 9 inches, it is evident that the sound proceeding out from 49 and reflected at 46 and finally reaching 14, has traveled 9 miles. If, again, the length between the key depression record on the oscillograph 27 and the record made by the sound sent out from 49 and reflected back from 55, Fig. 2, is eight inches, then it follows that the ore body 44 is approximately 4 miles from the point 11. The ore body therefore lies at the intersection of the sphere described about 49 with radius 4 miles, with the sphere described about 18 with radius 9 minus 4, i. e., 5 miles.

The exact point on the line of intersection may be found in a number of ways. For example:

1. By placing 49 in the drill holes 12 or 13 or 14 and taking other sets of records another line of intersections may be found. The point of intersection of the two lines of intersection will give the point at which the ore body is, or sufficiently close thereto.

2. By determining, by means of the apparatus of applicant's United States application Serial No. 54,556, filed October 7, 1915, shown diagrammatically in Fig. 3, and referred to below, the exact direction of the reflection points 46 of Fig. 1 and 55 of Fig. 2, thus knowing the directions and the distances obtained as given above, the ore body is located.

3. By drilling a test hole, passing near but on the far side of the line of intersection obtained as above, Other modifications of applicant's method may be used. In fact, the mere determination of the time elapsing between the key depression record and the echo record made by reflection at 55, Fig. 2, together with a determination of the direction from which the echo is received is sufficient.

The extent of the ore body can be obtained by readings made by transferring 49 to the drill holes 12, 13, 14, and taking readings on the oscillographs on sending out sounds at these drill holes; or it may be determined by the refraction of the sound sent out from 49 and received at 16, or by the echo obtained at 16 when the sounder 49 is operated at the drill hole 12.

In place of using an alternator 42, a condenser discharge may be used to actuate the sounder 49, as shown in Fig. 2. Here the condenser key 66, on being depressed, charges the condenser 67 from the battery 68 and on the key being released and coming up against the top key contact, discharges the condenser through the transformer secondary 32 and sounder 49, thus making a single sound impulse, or a rapidly oscillating one, if the discharge is an oscillatory one.

The vertical angle of reflection may be determined by hauling the transmitter 49 or the receivers 18, 15, up or down in the drill holes.

In Fig. 3 is shown the apparatus for determining the direction of the sound received. Here 15, 15', are two sound receivers, preferably small oscillators, connected in series preferably, their leads being the conductors 19, 20, connected to the oscillograph 27.

53 is a rod supporting the two receivers, 15, 15', by which they may be turned in any direction. On turning them, the sound will be a maximum if they are connected so as to assist each other, when they are in a plane at right angles to the direction of the received sound. If they are connected so as to oppose each other, the sound will be a minimum when they are in this plane. In this way by drawing a perpendicular to the plane so determined, the direction from which the sound comes may be determined.

By the term "sound inflection" I mean bending of the line of sound propagation, either by reflection, or by refraction.

What I claim is:

1. That method of determining the location of ore bodies which consists in generating sound waves and observing their inflection.

2. That method of determining the location of ore bodies by generating sounds and observing their inflection by the ore bodies, and their velocities.

REGINALD A. FESSENDEN.